(12) United States Patent
Ashiba

(10) Patent No.: US 9,194,455 B2
(45) Date of Patent: Nov. 24, 2015

(54) SHOCK ABSORBER

(71) Applicant: HITACHI AUTOMOTIVE SYSTEMS, LTD., Hitachinaka-shi, Ibaraki-ken (JP)

(72) Inventor: Masahiro Ashiba, Naka-gun (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/022,504

(22) Filed: Sep. 10, 2013

(65) Prior Publication Data
US 2014/0090940 A1 Apr. 3, 2014

(30) Foreign Application Priority Data

Sep. 28, 2012 (JP) ................................ 2012-215416

(51) Int. Cl.
*F16F 9/348* (2006.01)
*F16F 9/34* (2006.01)
*F16F 9/18* (2006.01)

(52) U.S. Cl.
CPC ... *F16F 9/34* (2013.01); *F16F 9/18* (2013.01); *F16F 9/348* (2013.01); *F16F 9/3484* (2013.01); *F16F 9/3488* (2013.01)

(58) Field of Classification Search
CPC ..... F16F 9/3214; F16F 9/3482; F16F 9/3484; F16F 9/3485; F16F 9/3488
USPC .................................................... 188/322.15
See application file for complete search history.

(56) References Cited

U.S. PATENT DOCUMENTS

| 2,648,405 | A | * | 8/1953 | Palmer | 188/320 |
| 4,905,799 | A | | 3/1990 | Yamaoka et al. | |
| 6,089,142 | A | * | 7/2000 | Adrian et al. | 92/181 P |
| 6,460,664 | B1 | * | 10/2002 | Steed et al. | 188/322.15 |
| 8,157,065 | B2 | * | 4/2012 | Ashiba | 188/322.15 |
| 8,800,729 | B2 | * | 8/2014 | Yabe et al. | 188/266.6 |
| 8,833,532 | B2 | * | 9/2014 | Yamashita | 188/282.6 |

FOREIGN PATENT DOCUMENTS

| DE | 19758625 A1 | * | 8/2001 |
| DE | 10351357 B3 | * | 2/2005 |
| EP | 336692 A2 | * | 10/1989 |
| FR | 1545406 A | * | 11/1968 |
| JP | 2-66333 | | 3/1990 |

* cited by examiner

*Primary Examiner* — Anna Momper
(74) *Attorney, Agent, or Firm* — Nixon & Vanderhye P.C.

(57) ABSTRACT

A shock absorber includes an annular outer seat protruding from a valve main body, an inner seat protruding inward of the outer seat of the valve main body, an intermediate seat disposed between the outer seat and the inner seat of the valve main body and protruding to surround an opening section of a passage, a first disk having a larger diameter than the outer seat and seated on the intermediate seat, a spring member configured to press the first disk toward the outer seat, a second disk stacked on the first disk, and a communication unit configured to bring the passage in communication with a space between the intermediate seat and the outer seat. The first disk starts to be pressed by the spring member to abut the outer seat while abutting the inner seat and the intermediate seat.

15 Claims, 6 Drawing Sheets

SHOCK ABSORBER

BACKGROUND OF THE INVENTION

1. Field of the Invention

The present invention relates to a shock absorber.

Priority is claimed on Japanese Patent Application No. 2012-215416, filed Sep. 28, 2012, the content of which is incorporated herein by reference.

2. Description of Related Art

In Japanese Unexamined Patent Application, First Publication No. H02-66333, a shock absorber having an outer seat, an intermediate seat, and an inner seat is disclosed, in which the height of the intermediate seat is decreased and a disk is pressed against the intermediate seat by means of a spring to apply a set load to the disk In such a structure, since a valve-opening point at which the set load is increased is increased, valve properties become unsuitable.

SUMMARY OF THE INVENTION

The present invention provides a shock absorber capable of appropriately adjusting valve properties.

According to a first aspect of the present invention, a shock absorber includes a cylinder in which a working fluid is sealed; a piston slidably inserted into the cylinder and configured to partition the inside of the cylinder into two chambers; a piston rod connected to the piston and extending toward the outside of the cylinder; a passage through which the working fluid flows by sliding movement of the piston; and a damping force-generating mechanism installed at a portion of the passage and configured to control a flow of the working fluid to generate a damping force. The damping force-generating mechanism includes a valve main body through which the passage passes; an annular outer seat protruding from the valve main body; an inner seat protruding inward of the outer seat of the valve main body; an intermediate seat disposed between the outer seat and the inner seat of the valve main body and protruding to surround an opening section of the passage; a first disk having a larger diameter than the outer seat and that sits on the intermediate seat; a spring member configured to press the first disk toward the outer seat; a second disk stacked on the first disk; and a communication unit configured to bring the passage in communication with a space between the intermediate seat and the outer seat. The first disk starts to be pressed by the spring member to abut the outer seat while abutting the inner seat and the intermediate seat.

According to a second aspect of the present invention, the spring member may be stacked on the first disk and may have a plate shape having a spacing section partially spaced apart from the first disk in the radial direction.

According to a third aspect of the present invention, the shock absorber may further include a disk support section protruding between the intermediate seat and the inner seat of the valve main body; and a third disk having a diameter smaller than that of the intermediate seat and larger than that of the disk support section and stacked on the second disk.

According to a fourth aspect of the present invention, a fixed orifice may be installed at the outer seat or the first disk. A flow path area of the communication unit may be larger than that of the fixed orifice.

According to a fifth aspect of the present invention, an abutting section in contact with the first disk may be partially formed at the spring member in the circumferential direction.

According to the above-mentioned shock absorber, suitable valve properties can be achieved.

DETAILED DESCRIPTION OF THE INVENTION

First Embodiment

A shock absorber of a first embodiment according to the present invention will be described below with reference to FIGS. 1 to 4.

Figure 1:
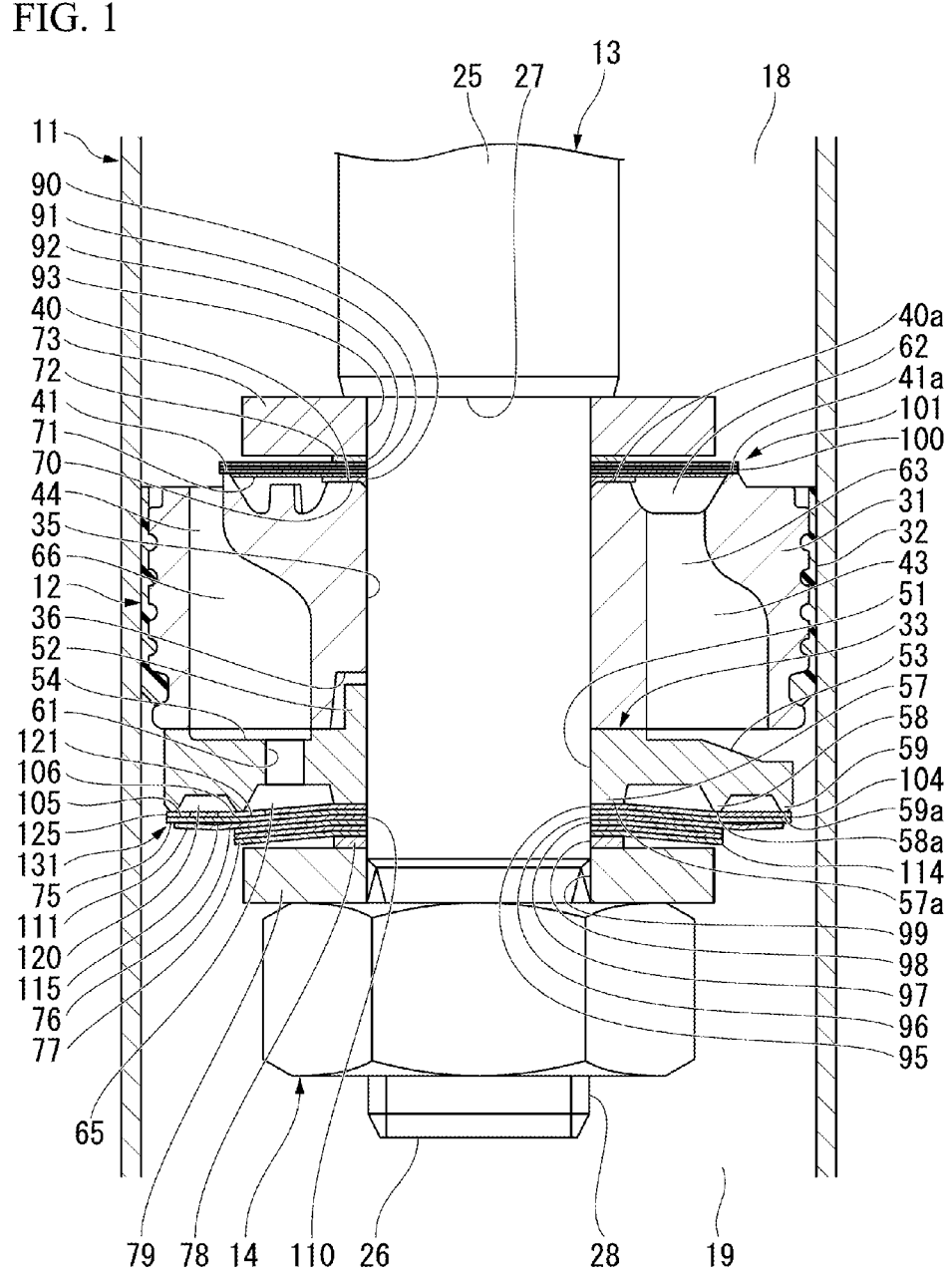
FIG. 1 is a partial cross-sectional view of a shock absorber of a first embodiment according to the present invention.

As shown in FIG. 1, a shock absorber of the first embodiment has a cylinder 11 in which a working fluid such as a liquid, a gas, or the like, is sealed. The cylinder 11 has a bottomed cylindrical shape with one end side (an upper side of FIG. 1, not shown) opened and the other end side (a lower side of FIG. 1) closed. A piston 12 is slidably fitted into the cylinder 11.

The other end side of a piston rod 13, the one end side (the upper side of FIG. 1) of which extends toward the outside of the cylinder 11, is inserted into the cylinder 11. The piston 12 is connected to the other end section of the piston rod 13 by a nut 14. In addition, one end side (not shown) of the piston rod 13 is inserted into a rod guide and an oil seal mounted on one end opening section of the cylinder 11 to extend toward the outside. The piston 12 partitions the inside of the cylinder 11 into two chambers, a rod chamber 18 of a side (an upper side of FIG. 1) from which the piston rod 13 extends, and a bottom chamber 19 of a bottom section side (a lower side of FIG. 1, not shown) of the cylinder 11.

The piston rod 13 has a main shaft section 25, and an attachment shaft section 26 disposed at an end section inside the cylinder 11 and having a smaller diameter than the main shaft section 25. Accordingly, a stepped section 27 is formed at the main shaft section 25 in a direction axially perpendicular to the end section of the attachment shaft section 26 side. A male screw 28 threadedly engaged with the above-mentioned nut 14 within a predetermined range opposite to the main shaft section 25 is formed at the attachment shaft section 26.

The piston 12 has a piston main body (a valve main body) 31 having a substantially circular plate shape, an annular sliding contact member 32 mounted on an outer circumferential surface of the piston main body 31 and configured to come in sliding contact with the inside of the cylinder 11, and a retainer (a valve main body) 33 disposed at the bottom chamber 19 side of the piston main body 31. In addition, the piston main body 31 and the retainer 33 are formed by sintering.

An insertion hole 35 into which the piston rod 13 is inserted is formed at a center in a radial direction to pass through the piston main body 31 in an axial direction thereof. A positioning concave section 36 concaved in the axial direction and the radial direction is partially formed at the opening section of the insertion hole 35 adjacent to the bottom chamber 19 in a circumferential direction thereof. In addition, an annular inner seat 40 axially protruding from the end section adjacent to the rod chamber 18 at the outside of the insertion hole 35 in the radial direction, and an annular outer seat 41 axially protruding toward the outside more than the inner seat 40 in the radial direction, are formed at the piston main body 31. Protrusion heights of the inner seat 40 and the outer seat 41 toward the rod chamber 18 are set such that the protrusion height of the outer seat 41 is slightly larger than that of the inner seat 40. That is, a height of a tip of the outer seat 41 in a protrusion direction of the seat surface 41a is larger than a height of a tip of the inner seat 40 in a protrusion direction of a seat surface 40a.

A plurality of passage holes 43 (only one is shown in the cross-sectional view of FIG. 1) opened between the inner seat 40 and the outer seat 41 at the rod chamber 18 side to axially pass therethrough are formed in the piston main body 31 at intervals in the circumferential direction. In addition, a plurality of passage holes 44 (only one is shown in the cross-sectional view of FIG. 1) opened outside at the rod chamber 18 side more than the outer seat 41 to axially pass therethrough are formed in the piston main body 31 at intervals in the circumferential direction. The passage holes 43 and the passage holes 44 are alternately disposed in the circumferential direction of the piston main body 31.

An insertion hole 51 into which the piston rod 13 is inserted in the retainer 33 at a center in the radial direction is formed to axially pass therethrough. A positioning convex section 52 axially protruding from the outside in the radial direction of the opening section of the insertion hole 51 adjacent to the piston main body 31 is partially formed in the circumferential direction. In addition, a plurality of passage cutout sections 53 (only one is shown in the cross-sectional view of FIG. 1) concaved in the axial direction to protrude from between the insertion hole 51 and the outer circumferential section toward the outer circumferential section are formed at the retainer 33 adjacent to the piston main body 31 at intervals in the circumferential direction. In addition, a plurality of passage concave sections 54 (only one is shown in the cross-sectional view of FIG. 1) concaved in the axial direction between the insertion hole 51 and outer circumferential section are formed at the retainer 33 adjacent to the piston main body 31 at intervals in the circumferential direction. The passage cutout sections 53 and the passage concave sections 54 are alternately disposed in the circumferential direction of the piston main body 31.

An annular inner seat 57 axially protruding from the outside of the insertion hole 51 in the radial direction, an annular intermediate seat 58 axially protruding from the outside of the inner seat 57 in the radial direction, and an annular outer seat 59 axially protruding from the outside of the intermediate seat 58 in the radial direction, are formed at the retainer 33 on a side opposite to the piston main body 31. Protrusion heights of the inner seat 57, the intermediate seat 58 and the outer seat 59 in the axial direction toward the bottom chamber 19 are set such that the protrusion height of the intermediate seat 58 is larger than that of the inner seat 57, and the protrusion height of the outer seat 59 is equal to or larger than that of the intermediate seat 58. Here, even in a case that the protrusion height of the outer seat 59 is larger than that of the intermediate seat 58, a gradient obtained by dividing a height difference between a protrusion tip section of the inner seat 57 and a protrusion tip section of the intermediate seat 58 by a radius difference is larger than a gradient obtained by dividing a height difference between a protrusion tip section of the intermediate seat 58 and a protrusion tip section of the outer seat 59 by a radius difference.

In other words, a height of a seat surface 58a of the intermediate seat 58 is larger than a height in a protrusion direction of a seat surface 57a of a tip of the inner seat 57, and a height in a protrusion direction of a seat surface 59a of a tip of the outer seat 59 is equal to or larger than the height of the seat surface 58a of the intermediate seat 58. In addition, a height difference between the seat surface 58a of the intermediate seat 58 and the seat surface 57a of the inner seat 57 is larger than a height difference (which may be 0) between the seat surface 58a of the intermediate seat 58 and the seat surface 59a of the outer seat 59.

A passage hole 61 having one end opened at the passage concave section 54 and the other end opened between the inner seat 57 and the intermediate seat 58 is formed in the retainer 33 to pass therethrough in the axial direction at a position of a bottom surface of the entire passage concave section 54.

When the retainer 33 fits the positioning convex section 52 into the positioning concave section 36 to coincide with a position in the radial direction with respect to the piston main body 31, the passage cutout section 53 matches the position in the circumferential direction to the passage hole 43, and the passage concave section 54 matches the position in the circumferential direction to the passage hole 44. Accordingly, the passage cutout section 53 is in communication with the passage hole 43, and the passage concave section 54 is in communication with the passage hole 44. The passage cutout section 53 and the passage hole 43 constitute the passage 63 that is capable of communicating with the rod chamber 18 and the bottom chamber 19, together with a chamber 62 between the inner seat 40 and the outer seat 41. The passage concave section 54, the passage hole 44 and the passage hole 61 constitute a passage 66 that is capable of communicating with the rod chamber 18 and the bottom chamber 19, together with a chamber 65 between the inner seat 57 and the intermediate seat 58.

A spacer 70, a disk 71, a spacer 72 and a restriction member 73 are sequentially installed at the piston main body 31 of the piston 12 near the rod chamber 18 in the axial direction in sequence from the piston main body 31 side. In addition, a first disk 75, a spring member 76, a second disk 77, a spacer 78 and a restriction member 79 are sequentially installed at the piston main body 31 of the piston 12 near the bottom chamber 19 in the axial direction in sequence from the piston main body 31 side.

An insertion hole 90 is formed to pass through the center in the radial direction of the spacer 70 in the axial direction. An insertion hole 91 is formed to pass through the center in the radial direction of the disk 71 in the axial direction. An insertion hole 92 is formed to pass through the center in the radial direction of the spacer 72 in the axial direction. An insertion hole 93 is formed to pass through the center in the radial direction of the restriction member 73 in the axial direction. In addition, an insertion hole 95 is formed in the center in the radial direction of the first disk 75. An insertion hole 96 is formed in the center in the radial direction of the spring member 76. An insertion hole 97 is formed in the center in the radial direction of the second disk 77. An insertion hole 98 is formed in the center in the radial direction of the spacer 78. An insertion hole 99 is formed in the center in the radial direction of the restriction member 79.

Then, the attachment shaft section 26 of the piston rod 13 is inserted in sequence of the insertion hole 93 of the restriction member 73, the insertion hole 92 of the spacer 72, the insertion hole 91 of the disk 71, the insertion hole 90 of the spacer 70, the insertion hole 35 of the piston main body 31, the insertion hole 51 of the retainer 33, the insertion hole 95 of the first disk 75, the insertion hole 96 of the spring member 76, the insertion hole 97 of the second disk 77, the insertion hole 98 of the spacer 78, and the insertion hole 99 of the restriction member 79. In this state, the nut 14 is threadedly engaged with the attachment shaft section 26. Then, all of the restriction member 73, the spacer 72, the disk 71, the spacer 70, the piston main body 31, the retainer 33, the first disk 75, the spring member 76, the second disk 77, the spacer 78 and the restriction member 79 are stacked on the attachment shaft section 26 to restrict movement in the radial direction. In this stacked state, the inner circumferential side is sandwiched between the stepped section 27 of the piston rod 13 and the nut 14, and the inner circumferential side is clamped with respect to the piston rod 13 to be immovable in the axial direction.

The spacer 70 has an outer diameter slightly larger than the outer diameter of the seat surface 40a of the inner seat 40. The disk 71 is constituted by a plurality of (specifically, four) stacked single body disks 100 having the same shape. An outer diameter of the disk 71 is slightly larger than an outer diameter of the seat surface 41a of the outer seat 41. In a natural state before assembly to the piston rod 13, the single body disk 100 has front and rear surfaces having a flat shape disposed at a certain position in the axial direction. Accordingly, similarly, the disk 71 also has a flat shape. The spacer 72 has an outer diameter slightly smaller than an outer diameter of the seat surface 40a of the inner seat 40. The restriction member 73 has an outer diameter slightly smaller than an inner diameter of the seat surface 41a of the outer seat 41.

As shown in FIG. 1, the disk 71 can be seated on the seat surface 41a of the outer seat 41 of the piston main body 31 to close the passage 63 formed at the piston main body 31 and the retainer 33 when assembled to the piston rod 13 to be in a non-working state in which there is no pressure difference between the rod chamber 18 and the bottom chamber 19. Then, when the piston rod 13 is moved toward a compression side at which an advance amount into the cylinder 11 is increased, if the pressure of the bottom chamber 19 is increased to be larger than the pressure of the rod chamber 18 by the piston 12 moved with the piston rod 13, the disk 71 is separated from the outer seat 41 to open the passage 63. Accordingly, a working fluid flows from the bottom chamber 19 toward the rod chamber 18 via the passage 63 at a flow rate corresponding to a valve-opening amount of the disk 71 and the outer seat 41. That is, when the piston rod 13 is moved toward the compression side in the passage 63 and the piston 12 is slid into the cylinder 11 with the piston rod 13, the working fluid flows from the bottom chamber 19 toward the rod chamber 18 by the sliding movement.

The piston main body 31 and the retainer 33 through which the passage 63 passes, the annular outer seat 41 protruding from the piston main body 31 to surround the opening section of the passage 63, the inner seat 40 configured to integrally hold the disk 71 of the piston main body 31, and the disk 71 configured to open and close the rod chamber 18 side of the passage 63 constitute a damping force-generating mechanism 101 of the compression side installed at a portion of the passage 63 and configured to control a flow of the working fluid to generate a damping force.

The first disk 75 is constituted by stacking a plurality of (specifically, two) single body disks 104 having the same shape. An outer diameter of the first disk 75 is larger than an outer diameter of the seat surface 59a on which the outer seat 59 sits. In a natural state before assembly to the piston rod 13, the single body disk 104 has front and rear surfaces having a flat shape disposed at a certain position in the axial direction. Accordingly, similarly, the first disk 75 also has a flat shape. A disk cutout section 105 having a shape passing therethrough in the axial direction and exiting the circumferential edge section is formed at the outer circumferential section of the single body disk 104 nearest to the retainer 33 of the first disk 75. In addition, a disk passage hole 106 closer to the inside than the circumferential edge section of the outer circumferential section is formed at the single body disk 104 nearest to the retainer 33 side.

Figure 2A:
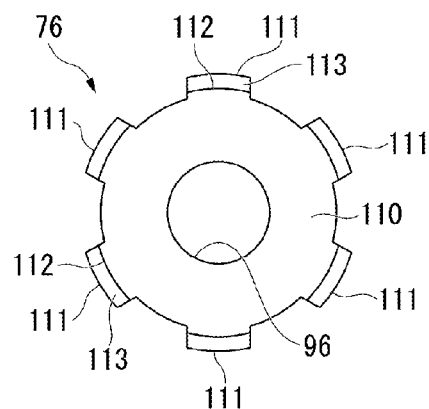
FIG. 2A is a plan view showing a spring member used for the shock absorber of the first embodiment according to the present invention.
Figure 2B:
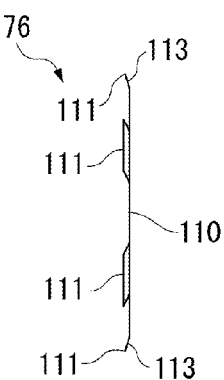
FIG. 2B is a side view showing the spring member used for the shock absorber of the first embodiment according to the present invention.

The spring member 76 has a shape shown in FIGS. 2A and 2B when the spring member 76 is in the natural state before assembly to the piston rod 13. The spring member 76 has a disk-shaped base plate section 110 having a plate shape and in which the insertion hole 96 is formed at the center thereof, and a plurality of (specifically, six) spring plate sections 111 having the same shape and extending from the base plate section 110 toward the outside in the radial direction at equal intervals in the circumferential direction. Each of the plurality of spring plate sections 111 is constituted by a base end plate section 112 of the base plate section 110 side and a tip plate section (an abutting section) 113 opposite to the base plate section 110.

The base plate section 110 has front and rear surfaces having a flat shape disposed at a certain position in the axial direction when the base plate section 110 is in a natural state. The base end plate section 112 of the spring plate section 111 has front and rear surfaces having a flat shape disposed on the same plane as the base plate section 110 when the spring plate section 111 is in a natural state. The tip plate section 113 of the spring plate section 111 is inclined with respect to the base plate section 110 and the base end plate section 112 such that a position in the axial direction of the base plate section 110 is spaced further apart from the base plate section 110 toward the outside (the tip side) in the radial direction when the tip plate section 113 is in a natural state. Accordingly, the spring plate section 111 is partially formed at the spring member 76 in the circumferential direction, and thus the tip plate section 113 of the spring plate section 111 is also partially formed in the circumferential direction. In addition, as shown in FIG. 3, the spring member 76 is stacked on the first disk 75 to be assembled to the piston rod 13 in a direction in which the tip plate section 113 protruding in the axial direction of the spring plate section 111 abuts the first disk 75.

As shown in FIG. 1, the second disk 77 is constituted by stacking a plurality of (specifically, three) single body disks 114 having the same shape. An outer diameter of the second disk 77 is larger than an outer diameter of the seat surface 58a of the intermediate seat 58 on which the first disk 75 sits. In a natural state before assembly to the piston rod 13, the single body disk 114 has front and rear surfaces having a flat shape disposed at a certain position in the axial direction. Accordingly, similarly, the second disk also has a flat shape.

The spacer 78 has an annular shape having an outer diameter substantially equal to an outer diameter of the seat surface 57a of the inner seat 57. The restriction member 79 has an annular shape having an outer diameter substantially equal to an inner diameter of the seat surface 58a of the intermediate seat 58.

Figure 3:
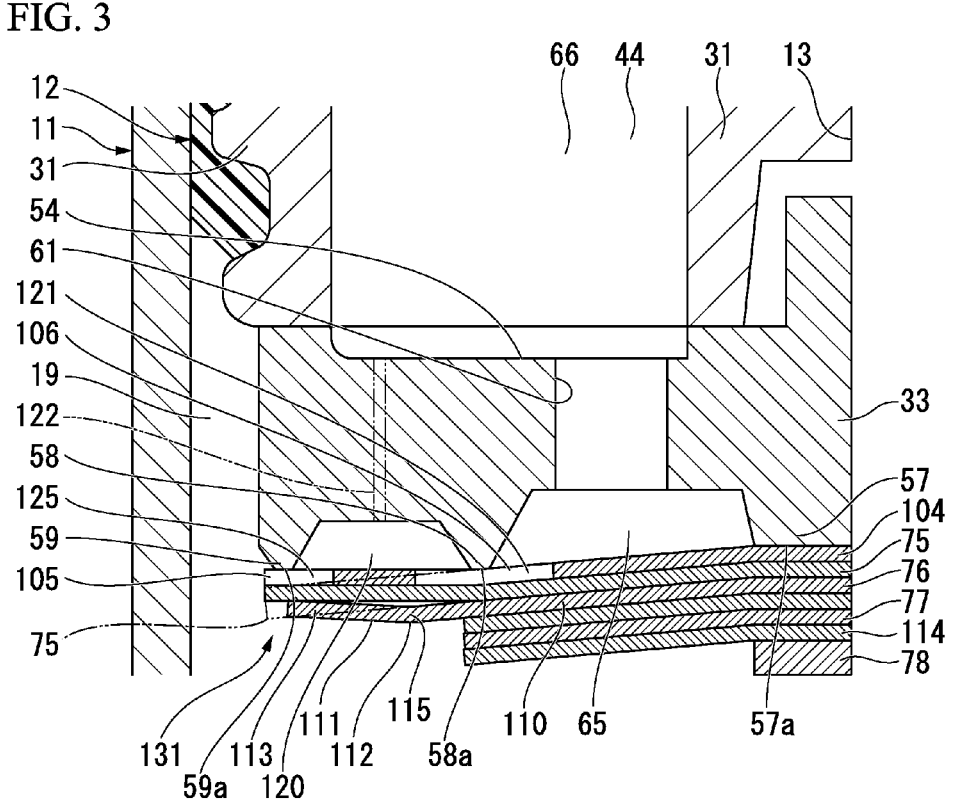
FIG. 3 is a partially enlarged cross-sectional view of major parts of the shock absorber of the first embodiment according to the present invention.

As shown in FIG. 1, the first disk 75 is adhered to the seat surface 57a of the inner seat 57 of the retainer 33 to abut the seat surface 58a of the intermediate seat 58 as shown in FIG. 3 when assembled to the piston rod 13 and is in a non-working state in which there is no pressure difference between the rod chamber 18 and the bottom chamber 19. As described above, a protrusion height of the intermediate seat 58 is larger than that of the inner seat 57. For this reason, the first disk 75 is elastically deformed in a tapered shape so as to be disposed closer to an opposite side of the piston main body 31 in the axial direction toward the outside in the radial direction.

In addition, a gradient of a line connecting the protrusion tip section of the inner seat 57 and the protrusion tip section of the intermediate seat 58 (more specifically, a line connecting an outer circumferential section of the seat surface 57a and an inner circumferential section of the seat surface 58a) is larger than a gradient of a line connecting the protrusion tip section of the intermediate seat 58 and the protrusion tip section of the outer seat 59 (which may be 0). For this reason, the first disk 75 extends in a direction in which the inner seat 57 and the intermediate seat 58 are connected, and becomes spaced from the outer seat 59 as shown by a two-dot chain line of FIG. 3 when the spring member 76 is not provided.

On the other hand, as shown by a solid line of FIG. 3, the tip plate section 113 of the spring plate section 111 partially formed in the circumferential direction of the spring member 76 abuts the outside in the radial direction of the tip section farther than an abutting position of the first disk 75 to the intermediate seat 58 to press the first disk 75 toward the piston main body 31 in the axial direction. In this state, as a result of the outer diameter of the first disk 75 being slightly larger than that of the seat surface 59a of the outer seat 59, the first disk 75 abuts the seat surface 59a of the outer seat 59. That is, the first disk 75 starts to be pressed by the spring member 76 to abut the outer seat 59 while abutting the inner seat 57 and the intermediate seat 58.

In addition, in this state, the spring member 76 has an outer diameter of the tip plate section 113 of the spring plate section 111 equal to that of the seat surface 59a of the outer seat 59. In addition, in this case, the spring member 76 has a spacing section 115 stacked on the first disk 75 and spaced apart from the first disk 75 partially in the radial direction. Specifically, the spacing section 115 becomes a curved position between the tip plate section 113 and the base end plate section 112. In the non-working state, the base plate section 110 of the spring member 76 is elastically deformed in a tapered shape so as to be disposed closer to an opposite side of the piston main body 31 in the axial direction toward the outside in the radial direction along an inner portion in the radial direction more than the intermediate seat 58 of the first disk 75. In addition, in this case, the tip plate section 113 of the spring plate section 111 of the spring member 76 is inclined so as to be disposed closer to the first disk 75 in the axial direction toward the outside in the radial direction.

In the non-working state, the second disk 77 abuts the base plate section 110 of the spring member 76, and is elastically deformed so as to be disposed closer to an opposite side of the piston main body 31 in the axial direction toward the outside in the radial direction along an inner portion in the radial direction more than the intermediate seat 58 of the first disk 75 in contact with the base plate section 110 of the spring member 76. The second disk 77 presses the first disk 75 toward the intermediate seat 58 via the spring member 76. Even in this state, the second disk 77 has an outer diameter slightly larger than an outer diameter of the seat surface 58a of the intermediate seat 58 of the retainer 33 and smaller than an inner diameter of the seat surface 59a of the outer seat 59.

In addition, the second disk 77 may press the first disk 75 toward the intermediate seat 58, and may have an outer diameter smaller than an outer diameter of the seat surface 58a of the intermediate seat 58 of the retainer 33.

In the non-working state, the disk passage hole 106 formed in the single body disk 104 abutting the outer seat 59 of the first disk 75 is formed to pass over the abutting position to the intermediate seat 58 from the inside in the radial direction toward the outside in the radial direction. That is, the disk passage hole 106 constitutes a communication passage (a communication unit) 121 to bring a chamber 120 between the intermediate seat 58 and the outer seat 59 in communication with the chamber 65 of the passage 66 when the first disk 75 abuts the intermediate seat 58. In other words, the chamber 120 and the passage 66 are always in communication with each other by the disk passage hole 106. In addition, instead of the disk passage hole 106, as shown by a two-dot chain line of FIG. 3, a passage hole 122 formed in the retainer 33 to come in communication with the chamber 120 from the passage concave section 54 may constitute a communication passage configured to bring the chamber 120 in communication with the passage 66.

In addition, in the non-working state, the disk cutout section 105 formed in the single body disk 104 abutting the outer seat 59 of the first disk 75 passes over the abutting position to the outer seat 59 from the inside in the radial direction toward the outside in the radial direction. Accordingly, the chamber 120 between the intermediate seat 58 and the outer seat 59 is always in communication with the bottom chamber 19. That is, the disk cutout section 105 constitutes a fixed orifice 125 configured to bring the passage 66 i.e., the rod chamber 18 in communication with the bottom chamber 19 via the communication passage 121 when the first disk 75 abuts the outer seat 59.

Here, in a state in which the first disk 75 abuts both of the intermediate seat 58 and the outer seat 59, a flow path area of the communication passage 121 formed in the disk passage hole 106 is larger than that of the fixed orifice 125 formed in the disk cutout section 105. In addition, instead of the disk cutout section 105, a seat cutout section including the seat surface 59a may be formed on the outer seat 59, and a fixed orifice may be formed.

In the non-working state shown in FIG. 1, the first disk 75 abuts the intermediate seat 58 and the outer seat 59 of the piston main body 31 to close the passage 66. In addition, in this state, the rod chamber 18 and the bottom chamber 19 are in communication with each other via the passage 66, the communication passage 121 and the fixed orifice 125. Then, from the non-working state, when the piston rod 13 is moved toward an extension side at which a protrusion amount from the cylinder 11 is increased, a pressure of the rod chamber 18 is increased to be higher than that of the bottom chamber 19 side by the piston 12 moved with the piston rod 13.

Figure 4:
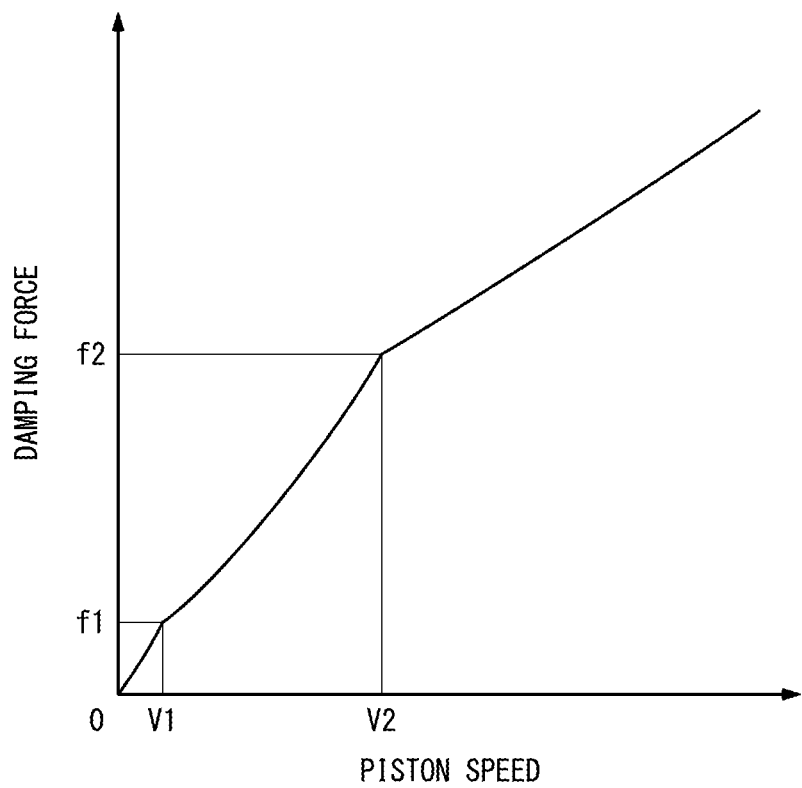
FIG. 4 is a characteristic diagram showing damping force characteristics of the shock absorber of the first embodiment according to the present invention.

Here, as shown in FIG. 4, when a piston speed, which is a moving speed of the piston 12 is within a predetermined range of 0 to v1, which is a slow range, the first disk 75 abuts the intermediate seat 58 with an elastic force thereof, and maintains a state abutting the outer seat 59 with a biasing force of the spring member 76, and a working fluid flows from the rod chamber 18 at a certain flow path area of the fixed orifice 125 toward the bottom chamber 19 via the passage 66, the communication passage 121 and the fixed orifice 125. Accordingly, a damping force of 0 to f1 shown in FIG. 4 of orifice characteristics (the damping force is in proportion to a square of the piston speed) is generated.

In addition, when the piston speed is within a predetermined range of v1 to v2, which is an intermediate range, the first disk 75 maintains the abutting state with the intermediate seat 58 by a biasing force of the second disk 77, and is deformed from the outer circumferential section of the seat surface 58a of the intermediate seat 58 as a starting point against the biasing force of the spring member 76 so that the outer circumferential side is spaced apart from the outer seat 59. Then, a working fluid flows from the rod chamber 18 toward the bottom chamber 19 at a flow path area increased according to a valve-opening amount between the first disk 75 and the outer seat 59, which is larger than that of the fixed orifice 125, via the passage 66 and the communication passage 121. Accordingly, in a state in which the piston speed is within the intermediate range, a damping force of f1 to f2 shown in FIG. 4 of valve properties of a first stage (the damping force is in proportion to the piston speed) according to the valve-opening amount between the outer seat 59 and the first disk 75 is generated.

In addition, when a force of the spring member 76 is set to a force slightly larger than a force by which the first disk 75 is straightly recovered, a minimum damping force f1 of the valve properties of the first stage can approach 0. On the other hand, when the force of the spring member 76 is increased, the minimum damping force f1 can be increased according thereto. In addition, an inclination of the valve properties of the first stage can be varied by varying an area of the communication passage 121 that spans the intermediate seat 58.

Further, when the piston speed is within a predetermined range v2, which is a high range, the first disk 75 is deformed from the outer circumferential section of the seat surface 57a of the inner seat 57 as a starting point against the biasing force of the spring member 76 and the second disk 77 to be spaced apart from the intermediate seat 58. Then, a working fluid flows from the rod chamber 18 toward the bottom chamber 19 at a flow path area increase according to the valve-opening amount between the first disk 75 and the intermediate seat 58, which is larger than the communication passage 121, via the passage 66. Accordingly, a damping force of f2 or more shown in FIG. 4 of the valve properties of a second stage according to the valve-opening amount between the intermediate seat 58 and the first disk 75 is generated.

In addition, the valve properties of the second stage have an increased damping force ratio with respect to the piston speed, which is smaller than that of the valve properties of the first stage. A minimum damping force f2 of the valve properties of the second stage can be varied by a step amount between the intermediate seat 58 and the inner seat 57, and an elastic force (a plate thickness or the number of plates of the single body disk) of the spring member 76 and the second disk 77.

Accordingly, in the passage 66 formed in the piston main body 31 and the retainer 33, when the piston rod 13 is moved toward the extension side and the piston 12 is slid in the cylinder 11 with the piston rod 13, the working fluid flows from the rod chamber 18 toward the bottom chamber 19 by the sliding movement.

The piston main body 31 and the retainer 33 through which the passage 66 passes, the annular outer seat 59 protruding from the retainer 33, the inner seat 57 protruding inward in the outer seat 59 of the retainer 33, the intermediate seat 58 protruding to surround the opening section of the passage 66 between the outer seat 59 and the inner seat 57 of the retainer 33, the first disk 75 having a larger diameter than the outer seat 59 and seated on the intermediate seat 58, the spring member 76 configured to press the first disk 75 toward the outer seat 59, the second disk 77 stacked on the first disk 75, and the communication passage 121 configured to come in contact with the chamber 120 and the passage 66 between the intermediate seat 58 and the outer seat 59 constitute a damping force-generating mechanism 131 of the extension side installed at a portion of the passage 66 and configured to control a flow of the working fluid to generate a damping force.

In the shock absorber disclosed in the above-mentioned Japanese Unexamined Patent Application, First Publication No. H02-66333, among the outer seat, the intermediate seat and the inner seat, the height of the intermediate seat is smaller than that of the inner seat and the outer seat, and the disk clamped to be adhered to the inner seat is pressed against the intermediate seat by the spring, applying a set load to the disk. In such a structure, since the set load of the disk to the outer seat is increased to raise the valve-opening point, the valve properties become unsuitable. That is, in accomplishment of damping force characteristics of the above-mentioned plural stages through an increase in height of the intermediate seat in comparison with the outer seat, when the member having the inner seat, the intermediate seat and the outer seat is manufactured by, for example, sintering, a height relation between the inner seat, the intermediate seat and the outer seat may deviate due to variations (tolerance) in manufacture. When the height relation between the inner seat, the intermediate seat and the outer seat deviates, the disk cannot simultaneously abut the intermediate seat and the outer seat, a gap therebetween may be increased to cause a leakage of the working fluid, and desired damping force characteristics may not be accomplished. For this reason, as disclosed in Japanese Unexamined Patent Application, First Publication No. H02-66333, the intermediate seat is lower than the inner seat and the outer seat, and the disk is pressed by the spring to abut both of the intermediate seat and the outer seat. However, when the disk is pressed by the spring and abuts the outer seat and the intermediate seat having a smaller height than the outer sheet, the set load of the outer seat to the disk is increased to raise the valve-opening point.

On the other hand, according to the shock absorber of the first embodiment, when the first disk 75 is abutting the inner seat 57 and the intermediate seat 58, the first disk 75 is spaced apart from the outer seat 59 without being pressed by the spring member 76. The first disk 75 starts to abut the outer sheet 59 only after to be pressed by the spring member 76. For this reason, even when the height relation between the inner seat 57, the intermediate seat 58 and the outer seat 59 deviates due to variations (tolerance) in manufacture, the first disk 75 can securely abut the outer seat 59 by the spring member 76. Further, the set load of the first disk 75 can be suppressed to a low level. Accordingly, since the first disk 75 can be easily separated from the outer seat 59 and rising of the valve-opening point can be suppressed, the valve properties can be improved to an appropriate level.

In addition, since the spring member 76 has a plate shape stacked on the first disk 75 and has the spacing section 115 spaced from the first disk 75 partially in the radial direction, unlike the case in which the coil spring is used, a length of the member configured to bias the first disk 75 is not increased in the axial direction but can be reduced in the axial direction.

Further, the fixed orifice 125 is installed at the first disk 75 (or the outer seat 59), and a flow path area of the communication passage 121 configured to come in communication with the chamber 120 and the passage 66 between the intermediate seat 58 and the outer seat 59 is larger than the flow path area of the fixed orifice 125. For this reason, the damping force characteristics of the orifice characteristics are obtained in a state in which the first disk 75 abuts the outer seat 59, and the damping force characteristics of the valve properties can be appropriately obtained when the first disk 75 is spaced apart from the outer seat 59.

In addition, since the tip plate section 113 abutting the first disk 75 is partially installed at the spring member 76 in the circumferential direction, a pressing force against the first disk 75 is intermittently generated in the circumferential direction. Accordingly, even when the first disk 75 is adhered to, for example, the outer seat 59, a portion at which the pressing force is weak is first spaced apart from the outer seat 59 to be entirely spaced apart therefrom appropriately.

Second Embodiment

Next, a second embodiment will be described with reference to FIGS. 5 and 6 focusing on differences from the first embodiment. In addition, common components of the first embodiment will be designated by the same name and reference numerals.

Figure 5:
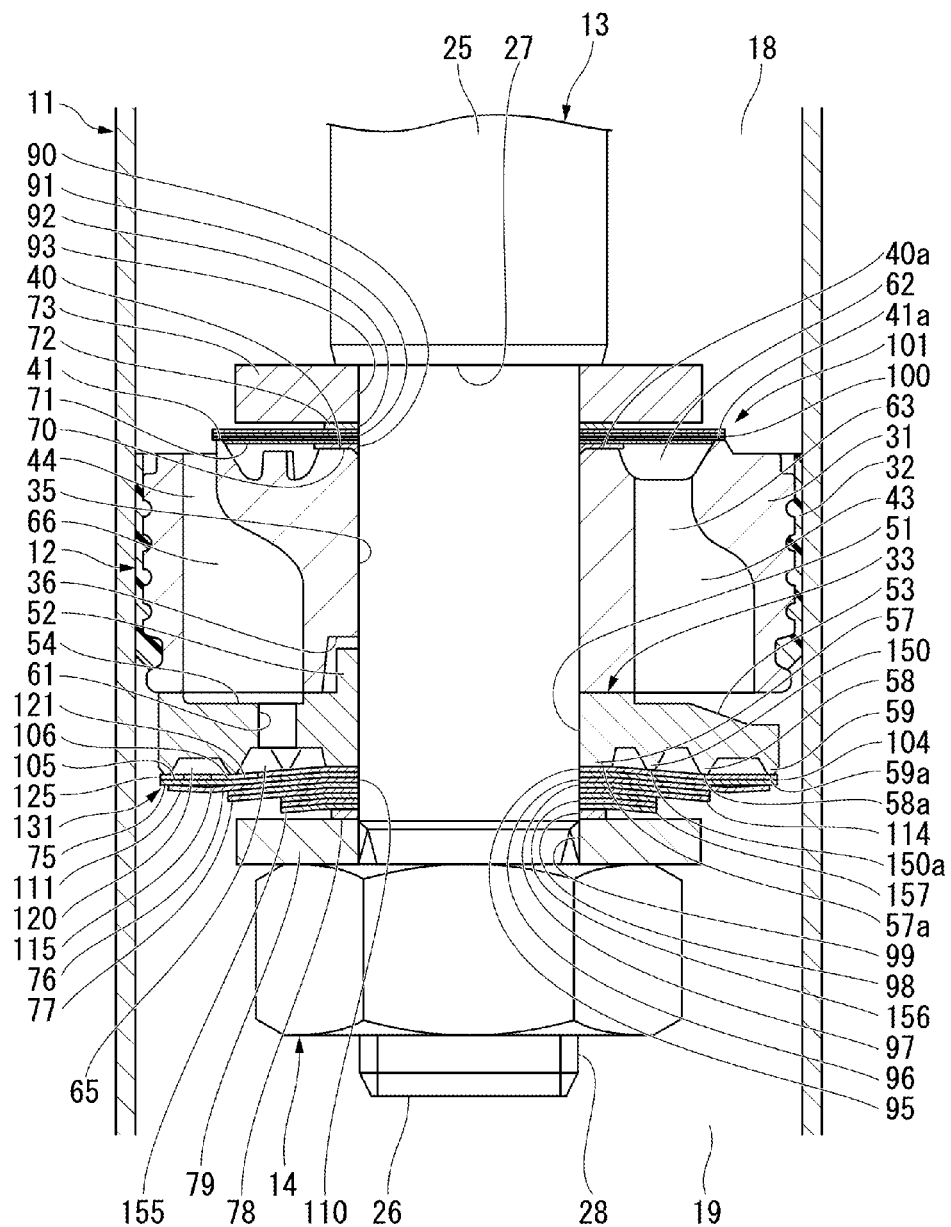
FIG. 5 is a partial cross-sectional view of a shock absorber of a second embodiment according to the present invention.

In the second embodiment, as shown in FIG. 5, a retainer 33 is partially different from that of the first embodiment. In the retainer 33 of the second embodiment, a plurality of disk support sections 150 protruding between the intermediate seat 58 and the inner seat 57 to a direction same with the intermediate seat 58 and the inner seat 57 are formed in the circumferential direction at equal intervals. Protrusion heights of the inner seat 57, the disk support section 150 and the intermediate seat 58 in the axial direction toward the bottom chamber 19 are set such that the protrusion height of the disk support section 150 is larger than that of the inner seat 57 and the protrusion height of the intermediate seat 58 is larger than that of the disk support section 150. However, a gradient obtained by dividing a height difference between the seat surface 57a of the inner seat 57 and a seat surface 150a of the disk support section 150 by a radius difference is equal to a gradient obtained by dividing a height difference between the seat surface 150a of the disk support section 150 and the seat surface 58a of the intermediate seat 58 by a radius difference.

In addition, in the second embodiment, a third disk 155 is stacked and installed between the second disk 77 and the spacer 78. In the third disk 155, like the second disk 77, an insertion hole 156 is formed in the center in the radial direction. The attachment shaft section 26 of the piston rod 13 is inserted through the insertion hole 156.

The third disk 155 is constituted by stacking a plurality of (specifically, three) single body disks 157 having the same shape. An outer diameter of the third disk 155 is larger than that of the seat surface 150a of the disk support section 150. In a natural state before assembly to the piston rod 13, the single body disks 157 have front and rear surfaces having a flat shape disposed at a certain position in the axial direction. Accordingly, similarly, the third disk 155 also has a flat shape.

In the non-working state, the third disk 155 abuts the second disk 77, and like the second disk 77, is elastically deformed so as to be disposed closer to an opposite side of the piston main body 31 in the axial direction toward the outside in the radial direction and closer to the inner portion in the radial direction than the intermediate seat 58 of the first disk 75 abutting the base plate section 110 of the spring member 76. Even in this state, the third disk 155 has an outer diameter slightly larger than an outer diameter of the seat surface 150a of the disk support section 150 of the retainer 33 and slightly smaller than an inner diameter of the seat surface 58a of the intermediate seat 58.

When the piston rod 13 is moved from the non-working state shown in FIG. 5 toward the extension side at which the protrusion amount from the cylinder 11 is increased, a pressure of the rod chamber 18 becomes larger than that of the bottom chamber 19 side by the piston 12 moved with the piston rod 13.

Figure 6:
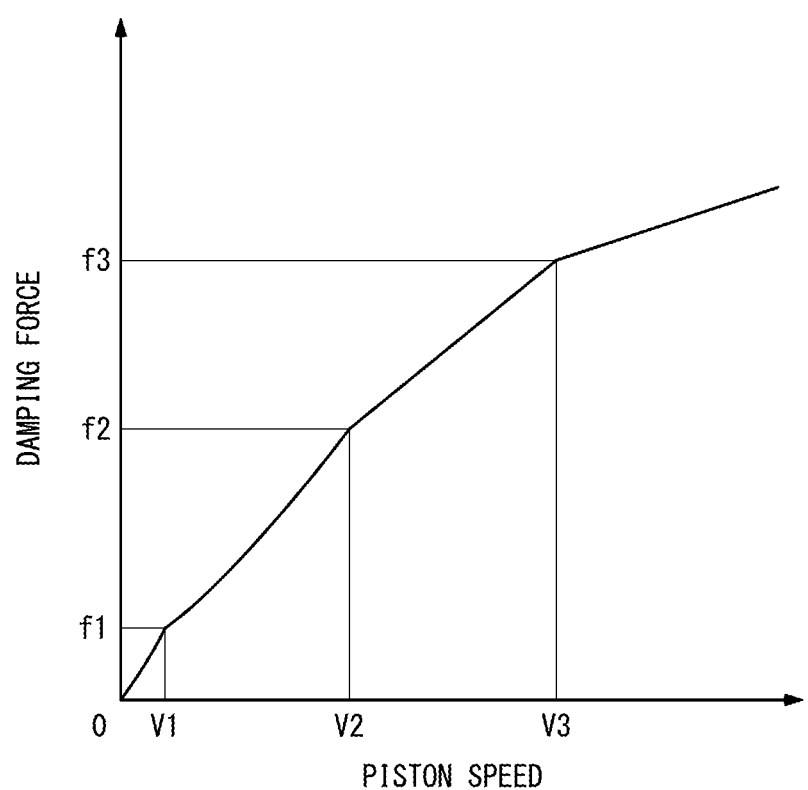
FIG. 6 is a characteristic diagram showing damping force characteristics of the shock absorber of the second embodiment according to the present invention.

Here, as shown in FIG. 6, when the piston speed is within a predetermined range 0 to v1, which is a slow range, like the first embodiment, the first disk 75 maintains a state abutting the outer seat 59, and a working fluid flows from the rod chamber 18 toward the bottom chamber 19 at a constant flow path area of the fixed orifice 125 via the passage 66, the communication passage 121 and the fixed orifice 125, generating the damping force of 0 to f1 shown in FIG. 6 of the orifice characteristics.

In addition, even when the piston speed is within a predetermined range v1 to v2, which is an intermediate range, like the first embodiment, while the first disk 75 maintains the abutting state with the intermediate seat 58, the first disk 75 is deformed from the outer circumferential section of the seat surface 58a of the intermediate seat 58 as a starting point so that the outer circumferential side is spaced apart from the outer seat 59, a working fluid flows from the rod chamber 18 toward the bottom chamber 19 at a flow path area increased according to the valve-opening amount between the first disk 75 and the outer seat 59 via the passage 66 and the communication passage 121, and a damping force of f1 to f2 shown in FIG. 6 of the valve properties of the first stage according to the valve-opening amount between the outer seat 59 and the first disk 75 is generated.

Further, when the piston speed is within an intermediate range v2 to v3, which is a higher range than the above-mentioned range, the first disk 75 is deformed from the outer circumferential section of the seat surface 150a of the disk support section 150 as a starting point against the biasing force of the spring member 76 and the second disk 77 to be spaced apart from the intermediate seat 58 while maintaining the abutting state with the disk support section 150. Then, a working fluid flows from the rod chamber 18 toward the bottom chamber 19 at a flow path area increased according to the valve-opening amount between the first disk 75 and the intermediate seat 58, which is larger than the communication passage 121, via the passage 66. Accordingly, a damping force of f2 to f3 shown in FIG. 6 of the valve properties of the second stage according to the valve-opening amount between the intermediate seat 58 and the first disk 75 is generated. The valve properties of the second stage have an increased damping force ratio with respect to the piston speed, which is smaller than that of the valve properties of the first stage.

Further, when the piston speed is within a predetermined range v3 or more, which is a high range, the first disk 75 is deformed from the outer circumferential section of the seat surface 57a of the inner seat 57 as a starting point against the biasing force of the spring member 76, the second disk 77 and the third disk 155 to be spaced apart from the disk support section 150 and further spaced apart from the intermediate seat 58. Then, a working fluid flows from the rod chamber 18 toward the bottom chamber 19 at a flow path area increased according to the valve-opening amount between the first disk 75 and the intermediate seat 58, which is larger than the communication passage 121, via the passage 66. Accordingly, a damping force of f3 or more shown in FIG. 6 of the valve properties of the third stage according to the valve-opening amount between the intermediate seat 58 and the first disk 75 is generated. The valve properties of the third stage have an increased damping force ratio with respect to the piston speed, which is smaller than that of the valve properties of the second stage.

According to the second embodiment having the above-mentioned configuration, the disk support section 150 is installed between the intermediate seat 58 and the inner seat 57 of the retainer 33, and the third disk 155 having a diameter smaller than that of the intermediate seat 58 and larger than that of the disk support section 150 is stacked and installed on the second disk 77. For this reason, damping force characteristics of the valve properties of a multi-stage can be obtained.

Third Embodiment

Next, a third embodiment will be described with reference to FIG. 7 focusing on differences from the first embodiment. In addition, common components of the first embodiment will be designated by the same name and reference numerals.

Figure 7:
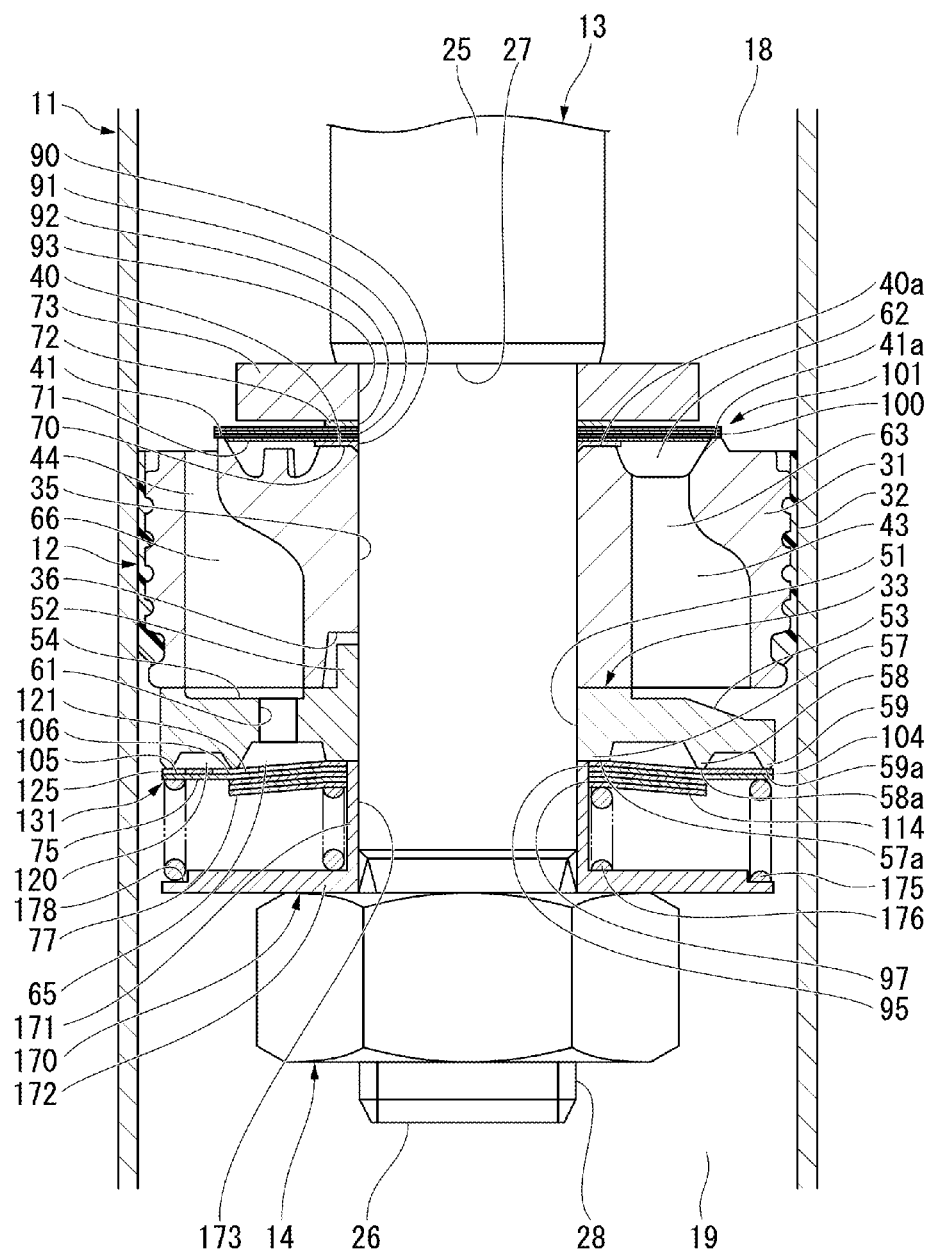
FIG. 7 is a partial cross-sectional view of a shock absorber of a third embodiment according to the present invention.

In the third embodiment, as shown in FIG. 7, a length of the attachment shaft section 26 of the piston rod 13 is increased, and a pressing member 170 is installed instead of the spacer 78 and the restriction member 79 of the first embodiment. The pressing member 170 has a cylindrical section 171 and a flange section 172 extending from one end in the axial direction of the cylindrical section 171 toward the outside in the radial direction. In a state in which the attachment shaft section 26 is inserted through an insertion hole 173 inside the cylindrical section 171, the pressing member 170 abuts the seat surface 57a of the inner seat 57 of the retainer 33 at an end section of the cylindrical section 171 opposite to the flange section 172, and abuts the nut 14 at an end section near the flange section 172 in the axial direction.

Then, the spring member 76 of the first embodiment is not installed, and the cylindrical section 171 of the pressing member 170 is inserted through the insertion hole 95 of the first disk 75 and the insertion hole 97 of the second disk 77. Here, the first disk 75 and the second disk 77 are slidable on the cylindrical section 171 in the axial direction. The first disk 75 and the second disk 77 are floating types movable in the axial direction as a whole.

An outer spring (a spring member) 175 constituted by a coil spring instead of the spring member 76 of the first embodiment is interposed between the first disk 75 and the flange section 172. In addition, an inner spring 176 constituted by a coil spring having a smaller diameter than the outer spring 175 is interposed inside between the second disk 77 and the flange section 172. The outer spring 175 has substantially the same diameter as the seat surface 59a of the outer seat 59. The inner spring 176 has substantially the same diameter as the seat surface 57a of the inner seat 57. A spring force of the inner spring 176 is larger than that of the outer spring 175 by a predetermined value. Movement in the radial direction of the inner spring 176 is restricted by the cylindrical section 171 of the inside thereof. Movement in the radial direction of the outer spring 175 is restricted by fitting one end in the axial direction into a cutout section 178 formed in the flange section 172.

According to the third embodiment of the above-mentioned configuration, in the non-working state shown in FIG. 7, the first disk 75 abuts the inner seat 57 and the intermediate seat 58 of the retainer 33 by a biasing force of the inner spring 176. For this reason, if the outer spring 175 is not provided, like the first embodiment, the first disk 75 is spaced apart from the outer seat 59. Then, the first disk 75 abuts the seat surface 59a of the outer seat 59 by a biasing force of the outer spring 175. That is, the first disk 75 starts to be pressed by the outer spring 175 to abut the outer seat 59 while abutting the inner seat 57 and the intermediate seat 58.

When the piston rod 13 is moved from the non-working state toward the extension side at which a protrusion amount from the cylinder 11 is increased, a pressure of the rod chamber 18 is increased to be larger than that of the bottom chamber 19 side by the piston 12 moved with the piston rod 13.

Here, when the piston speed is within a predetermined slow range, like the first embodiment, a state in which the first disk 75 abuts the outer seat 59 is maintained, and a working fluid flows from the rod chamber 18 toward the bottom chamber 19 at a certain flow path area of the fixed orifice 125 via the passage 66, the communication passage 121 and the fixed orifice 125, generating a damping force of the orifice characteristics.

When the piston speed is within a predetermined intermediate range, which is higher than the above-mentioned slow region, while maintaining an abutting state with the intermediate seat 58 by the biasing force of the inner spring 176 and the second disk 77, the first disk 75 is deformed from the outer circumferential section of the seat surface 58a of the intermediate seat 58 as a starting point such that the outer circumferential side is spaced apart from the outer seat 59 while reducing the length of the outer spring 175, and a working fluid flows from the rod chamber 18 toward the bottom chamber 19 at a flow path area increased corresponding to the valve-opening amount between the first disk 75 and the outer seat 59 via the passage 66 and the communication passage 121, generating a damping force of the valve properties of the first stage according to the valve-opening amount between the outer seat 59 and the first disk 75.

Further, when the piston speed is within a predetermined range, which is higher than the above-mentioned range, the first disk 75 is spaced apart from the outer seat 59, the intermediate seat 58 and the inner seat 57 against the biasing force of the outer spring 175, the second disk 77 and the inner spring 176. Then, a working fluid flows from the rod chamber 18 toward the bottom chamber 19 at a flow path area increased corresponding to the valve-opening amount between the first disk 75 and the outer seat 59, which is larger than the communication passage 121, via the passage 66. Accordingly, a damping force of the valve properties of the second stage according to the valve-opening amount between the outer seat 59 and the first disk 75 is generated. Even in this case, the valve properties of the second stage have an increased damping force ratio with respect to the piston speed, which is lower than that of the valve properties of the first stage.

While the embodiments described above show examples in which the present invention is applied to a damping force-generating mechanism of an extension side of a piston, the present invention is not limited thereto but may be applied to a damping force-generating mechanism of a compression side of the piston. In addition, while the embodiments show examples in which the present invention is applied to a single tube type shock absorber, the present invention may be applied to a double tube type shock absorber having an outer tube installed at an outer circumference of a cylinder to form a reservoir chamber therebetween, and may be used for any shock absorber. For example, when the present invention is applied to a double tube type shock absorber, the present invention can be applied to a damping force-generating mechanism of a bottom valve installed between a reservoir chamber and a bottom chamber.

The shock absorber of the above-mentioned embodiments includes a cylinder in which a working fluid is sealed, a piston slidably inserted into the cylinder and configured to partition the inside of the cylinder into two chambers, a piston rod connected to the piston and extending toward the outside of the cylinder, a passage through which the working fluid flows by sliding movement of the piston, and a damping force-generating mechanism installed at a portion of the passage and configured to control a flow of the working fluid to generate a damping force, wherein the damping force-generating mechanism includes a valve main body through which the passage passes, an annular outer seat protruding from the valve main body, an inner seat protruding inward in the outer seat of the valve main body, an intermediate seat disposed between the outer seat and the inner seat of the valve main body and protruding to surround an opening section of the passage, a first disk having a larger diameter than the outer seat and that sits on the intermediate seat, a spring member configured to press the first disk toward the outer seat, a second disk stacked on the first disk, and a communication unit configured to bring the passage in communication with a space between the intermediate seat and the outer seat, wherein the first disk starts to be pressed by the spring member to abut the outer seat while abutting the inner seat and the intermediate seat. Accordingly, since a set load of the first disk can be suppressed to a low level, the first disk can be easily spaced apart from the outer seat, and an increase in a valve-opening point can be suppressed. Accordingly, appropriate valve properties can be achieved.

In addition, the spring member is stacked on the first disk and has a plate shape having a spacing section partially spaced apart from the first disk in the radial direction. For this reason, like in the case in which the coil spring is used, the spring member can be reduced in size in the axial direction, rather than increasing a length in the axial direction.

Further, the shock absorber includes a disk support section protruding between the intermediate seat and the inner seat of the valve main body, and a third disk having a diameter smaller than that of the intermediate seat and larger than that of the disk support section and stacked on the second disk. For this reason, damping force characteristics of valve properties of a multi-stage can be obtained.

In addition, a fixed orifice is installed at the outer seat or the first disk, and a flow path area of the communication unit is larger than that of the fixed orifice. For this reason, damping force characteristics of the orifice characteristics can be obtained in a state in which the first disk abuts the outer seat, and damping force characteristics of the valve properties can be appropriately obtained when the first disk is spaced apart from the outer seat.

Further, an abutting section in contact with the first disk is partially formed at the spring member in a circumferential direction thereof. For this reason, a pressing force to the first disk can be intermittently generated in the circumferential direction, and thus the first disk can be appropriately separated from the outer seat.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A shock absorber comprising:
    a cylinder in which a working fluid is sealed;
    a piston slidably inserted into the cylinder and configured to partition the inside of the cylinder into two chambers;
    a piston rod connected to the piston and extending toward the outside of the cylinder;
    a passage through which the working fluid flows by sliding movement of the piston; and
    a damping force-generating mechanism installed at a portion of the passage and configured to control a flow of the working fluid to generate a damping force,
    wherein the damping force-generating mechanism comprises:
    a valve main body through which the passage passes;
    an annular outer seat protruding from the valve main body;
    an inner seat protruding inward of the outer seat of the valve main body;
    an intermediate seat disposed between the outer seat and the inner seat of the valve main body and protruding to surround an opening section of the passage, wherein heights of the intermediate seat and the outer seat in a protrusion direction are larger than that of the inner seat, and wherein a gradient of a line connecting a seat surface of the inner seat and a seat surface of the intermediate seat is larger than a gradient of a line connecting the seat surface of the intermediate seat and a seat surface of the outer seat;
    a first disk having a larger diameter than the outer seat and that sits on the intermediate seat;
    a spring member configured to press the first disk toward the outer seat such that the first disk abuts the outer seat;
    a second disk stacked on the first disk; and
    a communication unit configured to bring the passage in communication with a space between the intermediate seat and the outer seat.

2. The shock absorber according to claim 1, wherein the spring member is stacked on the first disk and has a plate shape having a spacing section partially spaced apart from the first disk in the radial direction.

3. The shock absorber according to claim 2, wherein the spring member includes a cylindrical base plate section and a plurality of spring members which extend outward in a radial direction from the base plate section, and wherein an abutting section which contacts with the first disk is formed at the spring member.

4. The shock absorber according to claim 1, further comprising:
    a disk support section protruding between the intermediate seat and the inner seat of the valve main body; and
    a third disk having a diameter smaller than that of the intermediate seat and larger than that of the disk support section and stacked on the second disk.

5. The shock absorber according to claim 1, wherein the spring member includes a cylindrical base plate section and a plurality of spring members which extend outward in a radial direction from the base plate section, and wherein an abutting section which contacts the first disk is formed at the spring member.

6. The shock absorber according to claim 1, wherein a fixed orifice is installed at the outer seat or the first disk, and a flow path area of the communication unit is larger than that of the fixed orifice.

7. The shock absorber according to claim 1, wherein a height of the outer seat in a protrusion direction is set to be equal to or larger than that of the intermediate seat.

8. The shock absorber according to claim 1, wherein the first disk and the second disk are fixed to the inner seat to be immovable in the axial direction.

9. A shock absorber comprising:
    a cylinder in which a working fluid is sealed;
    a piston slidably inserted into the cylinder and configured to partition the inside of the cylinder into two chambers;
    a piston rod connected to the piston and extending toward the outside of the cylinder;

a passage through which the working fluid flows by sliding movement of the piston; and a damping force-generating mechanism installed at a portion of the passage and configured to control a flow of the working fluid to generate a damping force, wherein the damping force-generating mechanism comprises:

a valve main body through which the passage passes;

an annular outer seat protruding from the valve main body;

an inner seat protruding inward of the outer seat of the valve main body;

an intermediate seat disposed between the outer seat and the inner seat of the valve main body and protruding to surround an opening section of the passage;

a first disk having a larger diameter than the outer seat and that sits on the intermediate seat;

a spring member configured to press the first disk toward the outer seat;

a second disk stacked on the first disk; and a communication unit configured to bring the passage in communication with a space between the intermediate seat and the outer seat, wherein the first disk abuts the outer seat while abutting the inner seat and the intermediate seat by being pressed by the spring member, wherein a fixed orifice is installed at the outer seat or the first disk, and a flow path area of the communication unit is larger than that of the fixed orifice.

10. The shock absorber according to claim 9, wherein a gradient of a line connecting a seat surface of the inner seat and a seat surface of the intermediate seat is larger than a gradient of a line connecting the seat surface of the intermediate seat and a seat surface of the outer seat.

11. The shock absorber according to claim 10, wherein heights of the intermediate seat and the outer seat in a protrusion direction are larger than that of the inner seat.

12. The shock absorber according to claim 9, wherein heights of the intermediate seat and the outer seat in a protrusion direction are larger than that of the inner seat.

13. A shock absorber comprising:

a cylinder in which a working fluid is sealed;

a piston slidably inserted into the cylinder and configured to partition the inside of the cylinder into two chambers;

a piston rod connected to the piston and extending toward the outside of the cylinder;

a passage through which the working fluid flows by sliding movement of the piston; and a damping force-generating mechanism installed at a portion of the passage and configured to control a flow of the working fluid to generate a damping force, wherein the damping force-generating mechanism comprises:

a valve main body through which the passage passes;

an annular outer seat protruding from the valve main body;

an inner seat protruding inward of the outer seat of the valve main body;

an intermediate seat disposed between the outer seat and the inner seat of the valve main body and protruding to surround an opening section of the passage, wherein heights of the intermediate seat and the outer seat in a protrusion direction are larger than that of the inner seat;

a first disk having a larger diameter than the outer seat and that sits on the intermediate seat;

a spring member configured to press the first disk toward the outer seat;

a second disk being stacked on the first disk; and a communication unit configured to bring the passage in communication with a space between the intermediate seat and the outer seat, wherein a gradient of a line connecting a seat surface of the inner seat and a seat surface of the intermediate seat is larger than a gradient of a line connecting the seat surface of the intermediate seat and a seat surface of the outer seat, and wherein the first disk abuts the outer seat while abutting the inner seat and the intermediate seat by being pressed by the spring member.

14. The shock absorber according to claim 13, wherein a height of the outer seat in a protrusion direction is set to be equal to or larger than that of the intermediate seat.

15. The shock absorber according to claim 13, wherein the spring member is stacked on the first disk and has a plate shape, and wherein an abutting section in contact with the first disk is partially formed at the spring member in the circumferential direction.

* * * * *